Fig. 4.

UNITED STATES PATENT OFFICE.

HUGH PARTRIDGE, OF JACKSONVILLE, FLORIDA, ASSIGNOR TO PARTRIDGE TRACTOR COMPANY INC., OF JACKSONVILLE, FLORIDA, A CORPORATION OF FLORIDA.

TRACTOR.

1,383,563.  Specification of Letters Patent.  Patented July 5, 1921.

Application filed February 20, 1920. Serial No. 360,122.

*To all whom it may concern:*

Be it known that I, HUGH PARTRIDGE, a citizen of the United States, residing at Jacksonville, in the county of Duval and State of Florida, have invented new and useful Improvements in Tractors, of which the following is a specification.

This application is filed as a continuation in part—that is as concerns any common patentably novel subject matter—of my pending application Serial No. 304,865.

This invention relates to improvements in tractors and more particularly to the transmission gearing thereof.

The principal objects of the invention are to provide gearing of extreme simplicity and sturdiness which will effect great economy of power, will enable the tractor to develop great pulling force, will be wear-compensating and not substantially liable to derangement or to impairment in consequence of the clouds of dust through which the tractor may move, will be adaptable to reverse movement as well as to different forward speeds and will embody exceedingly simple, easily operated and accessible control devices.

With the above objects in view, the invention consists generally in the combination of a pair of adjoining friction wheels mounted on alining jack shafts and which are driven from the main shaft at equal speeds and in opposite directions, direct reductions utilizing said jack shafts and interposed between said friction wheels and the respective traction wheels, one reduction consisting of external gearing, and the other of internal gearing, and the offset relation of the shafts or axles of the traction wheels whereby to compensate for variations in the distances between the centers of the gear wheels of the two reductions and thus provide a good and uniform rolling contact between the gear wheels of each reduction yet to maintain the balance of the tractor and to provide for the proper action of the traction wheels during turning. The invention further consists in certain details of the arrangement for operating the tractor at high or increased forward speed. The invention also consists generally in certain other features of structure and combination appertaining to the friction gearing between the main shaft and the jack shafts and which will be set forth in detail as the description proceeds.

A tractor in which the features of the invention are incorporated is illustrated in the accompanying drawings, wherein.

Similar characters of reference designate corresponding parts throughout the several views.

The features of the invention are applicable to a construction wherein the drive is applied to substantially oppositely disposed traction wheels 2, preferably located toward the rear of the frame 1. At its front said frame may be supported by a pair of wheels 3 which are utilized for steering in the well known manner. An internal combustion engine 4 is arranged longitudinally and near the front end of the tractor in the usual manner and its shaft 5 is geared to the wheels 2.

The improved transmission gearing includes as its operating element a shaft 7 driven from the motor shaft 5 and arranged longitudinally. The shaft 7 is preferably alined with the shaft 5, in such case being driven from the latter by a direct connection 8. In the construction shown and preferred the shaft 7 is mounted for axial sliding movement and the connection 8 is constructed to provide for such movement while maintaining the operatively coupled relation of the shafts 7 and 5; thus, the connection 8 may consist of a socket of square cross-section at the end of the shaft 5 and a conforming tang of square cross-section at the end of the shaft 7, the tang fitting closely but slidably in the socket. The shaft 7 has its bearings in supporting brackets 9 and 10 arranged adjacent its respective front and rear ends and is slidable with reference to said brackets. The bearing 11 at the front end of the shaft is fixed relatively to the bracket 9 and the shaft is slidable in said bearing; the bearing 12 at the rear end of the shaft is slidably mounted in the bracket 10 and is fixed relatively to said shaft whereby to participate in the sliding movements thereof.

Figure 1:
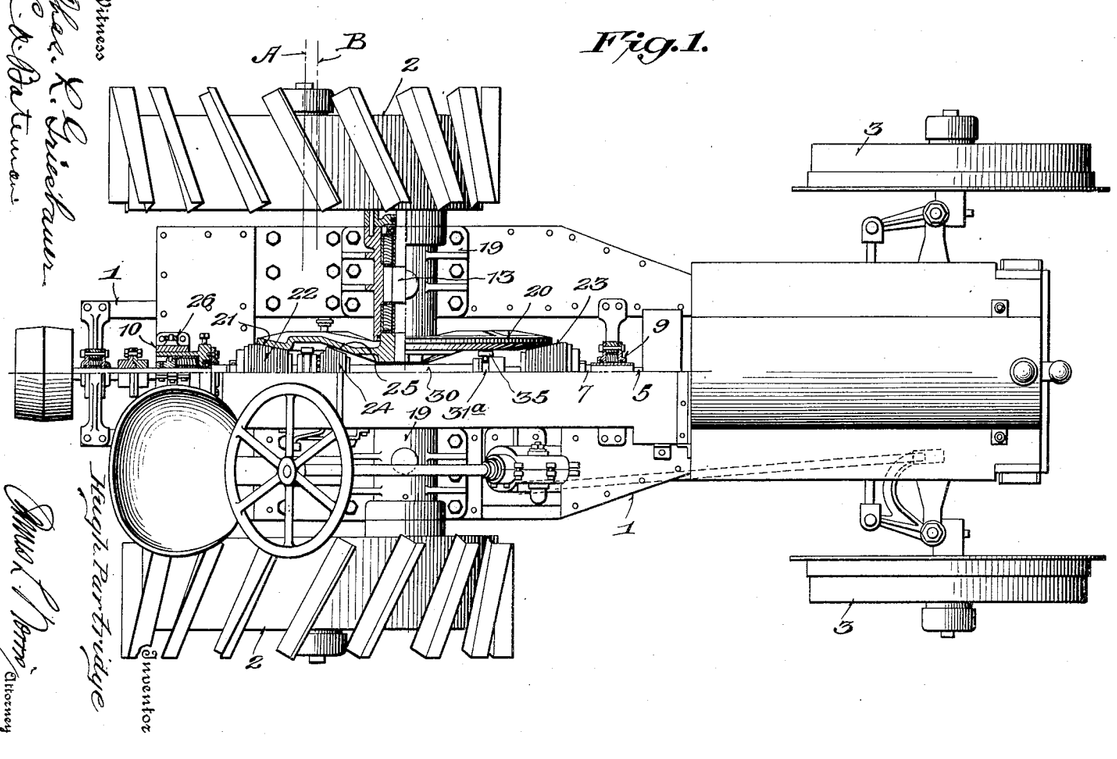
Figure 1 is a plan view, partly in horizontal section.
Figure 2:
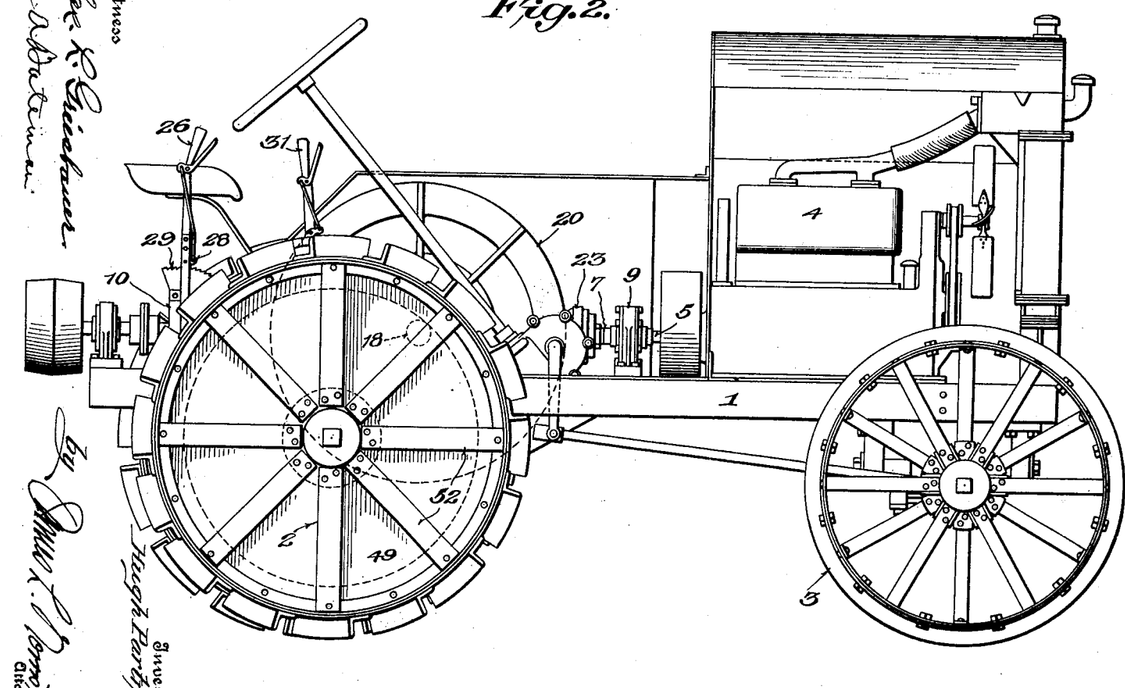
Fig. 2 is a side elevation.

The transmission gearing also includes a pair of alining transverse jack shafts 13 and 14 which are driven simultaneously in opposite directions from the shaft 7 and which are directly geared to said shaft 7 and to the traction wheels 2. For such latter purpose, one of the traction wheels is provided with an externally toothed concentric wheel 15 and the other traction wheel is provided with an internally toothed concentric wheel 16, the wheels 15 and 16, the drawings only being considered, being associated with the left and right wheels 2, respectively. The shafts 13 and 14 are fitted at their outer ends with pinions 17 and 18, respectively, for coöperation with the respective wheels 15 and 16, and are driven at the same speed. Consequently the gear ratio at both sides of the tractor must be the same. This requirement can be satisfied, the balance of the tractor maintained, a large reduction of speed and consequent increase of driving effort assured, and the differential action of the traction wheels when the tractor is being turned provided for, by offsetting the centers of the traction wheels in a common horizontal plane. In Fig. 1 the broken lines A and B coincide with the centers of the respective wheels 2 and graphically indicate the offset relation of these wheels. The degree of offset can be readily calculated in each case; that is to say, according to the proportions of the tractor and of the various gear elements as above specified, and is dependent upon or proportional to variations in the differences between the pitch diameters and, consequently, the distances between the gear centers at the two sides of the tractor. Both of the traction wheels must be of relatively large diameter for the purposes in view with their centers in a common horizontal plane and sufficiently close not to impair the balance of the tractor and it follows that the internal gear 16 will have a greater pitch diameter than the external gear 17. To maintain the gear ratio, the ratio of the teeth of the coöperating elements at both sides of the tractor must be the same, and the ratio of the pitch diameters of said elements must be the same as the ratio of the teeth; consequently, the pinion 18 which meshes with the wheel 16 will be of greater pitch diameter than the pinion 17 which meshes with the wheel 15. These variations in the pitch diameters at the two sides of the tractor result in the distance between the gear centers at one side of the tractor being different from the distance between the gear centers at the opposite side.

In the construction disclosed the jack shafts 13 and 14 are located somewhat in advance of the centers of the traction wheels and the traction wheel which carries the internal gear 16 and whose center is at less distance from the jack shafts than the center of the other traction wheel is, therefore, set in advance of—that is to say offset relatively to—the latter.

Touching the details of the gear reduction between the jack shafts and the traction wheels, it is to be noted that the pinions 16 and 18 are preferably formed as roller pinions; this has the advantage of providing for a minimum number of large sturdy teeth and of eliminating the necessity for hunting-teeth. It is also to be noted that wheels 15 and 16 may be many times in excess of the pinions 17 and 18 as regards size and, therefore, number of teeth and, hence, that the coöperating gear elements may effect a very considerable reduction of speed. The gear ratio of 10 to 1 is shown and is also preferred, the pinion 17 having four teeth and the pinion 18 five.

The shafts 13 and 14 are mounted in sturdy bearings 19 which serve rigidly to oppose the end thrusts of the friction wheels 20 mounted in confronting relation on the inner ends of said shafts and at opposite sides of the shaft 7. The friction wheels 20 form elements of the gearing between the shafts 13 and 14 and the shafts 7 and are provided with conical engaging faces 21 for coöperation with friction cone gears 22 and 23 on the shaft 7, the gear 22 being for the direct or forward drive and the gear 23 for the reverse. The gear faces 21 may be of relatively large diameter as compared with the gear 22, thereby to effect a very considerable reduction of speed. In the construction preferred, provision is made for driving the tractor at relatively high or increased forward speed, and for such purpose the shaft 7 carries a cone gear 24 arranged for coöperation with conical faces 25 provided on the wheels 20 within and concentric to the faces 21. The several cone gears are preferably of yieldable nature with good friction faces in order that they may be in large degree self-compensating for wear and also may be pressed tightly or strongly between the endwise-rigid coöperating faces 21 or 25, as the case may be, and thus insure the most effective transmission between the shaft 7 and the jack shafts 13 and 14. Laminated cone gears of well known construction for the purpose of efficient frictional engagement are preferably employed.

The gears 22 and 23 are movable as a unit in the endwise direction and have three positions, in the first of which the gear 22 is engaged with the faces 21 and the gear 23 runs free, in the second or intermediate of which neither of the gears 22 or 23 is engaged with said faces, and in the third of which the gear 23 is engaged with said faces, while the gear 22 runs free. In the construction shown and preferred the gears 22 and 23 which are keyed to the shaft 7 are also rigid in the endwise direction relatively to said shaft and are shifted into their various positions, as above explained, by appropriate endwise movements of the shaft. Such movements may be conveniently effected by an upright lever 26 which is pivoted at its lower end to the bracket 10 and above its pivot is connected by links 27 to the part of the bearing 12 located in front of said bracket. By rocking the lever 26 on its pivot, the bearing 12 is moved slidably in the bracket 10 and produces corresponding movements of the shaft 7. The lever 26 is preferably provided with a pawl 28 which coöperates with a rack quadrant 29 to hold said lever and the parts which it operates against retrograde movement. The gears 22 and 23 are preferably adjustable on the shaft 7 in order that their wear may be positively compensated as from time to time required.

The friction gear 24 is slidably keyed to the shaft 7 and is normally held out of engagement with its coöperating faces 25. The engagement of said gear with the faces 25 is established when the gears 22 and 23 are in their neutral positions. The gear 24 is preferably pulled into engagement with its coöperating faces 25, such manner of engaging said gear entirely eliminating the possibility of the accidental forward movement of the shaft 7 and consequent simultaneous engagement of the gears 22 and 24 with its obvious attendant disadvantages of undue wear of the former and loss of power. In the construction preferred, the gear 24 is mounted at the rear end of a sleeve 30 which fits over the shaft 7 and at its forward end is suitably related to the connections for positioning said gear. Such connections may comprise an upright lever 31 arranged in the rear of the gear 24 and connected at its lower end to a rock shaft 32 having an upwardly projecting arm 33 which is connected by a link 34 to an upright actuating arm 35, the latter being pivoted at its lower end and being formed at its upper end with a yoke which coöperates with a collar 31ª suitably mounted against endwise play on the sleeve 30. The lever 31 is preferably provided with a pawl 32ª for coöperation with a rack quadrant 33 in order to prevent retrograde movement of said lever and the gear 24 operated thereby.

It will be apparent that with the gear 24 held normally in an inoperative position in which it runs free, a movement of the shaft 7 by means of the lever 26 to its extreme forward position will establish the engagement of the gear 22 with the faces 21 in consequence of which the tractor will be driven forward at low speed; similarly, the movement of the shaft 7 to its extreme rearward position will establish the engagement of the gear 23 with the faces 21 and the movement of the tractor will be reversed—that is to say, the tractor will be driven rearward. The movement of the tractor may be arrested by shifting the shaft 7 to its intermediate position in which the gears 22 and 23 are inoperative, i. e. run free. The neutral or inoperative position of the gears 22 and 23 is an obvious prerequisite of the operation of the gear 24 to provide for the high speed operation of the tractor.

Figure 3:
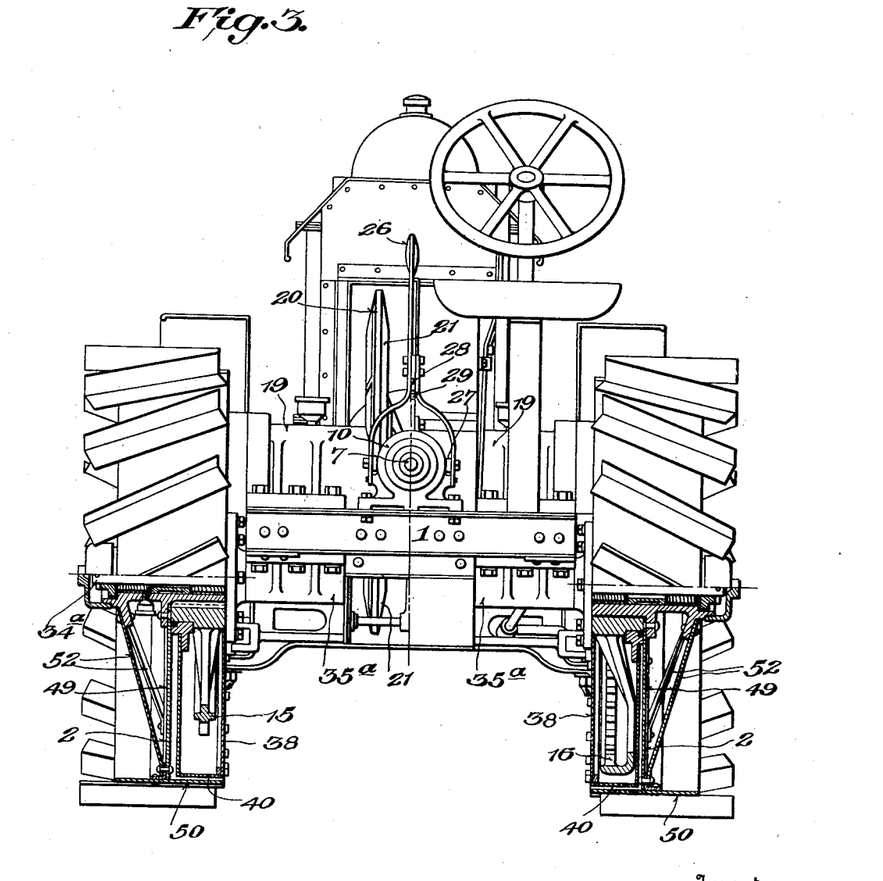
Fig. 3 is a rear elevation, the traction wheels being shown partly in section.
Figure 4:
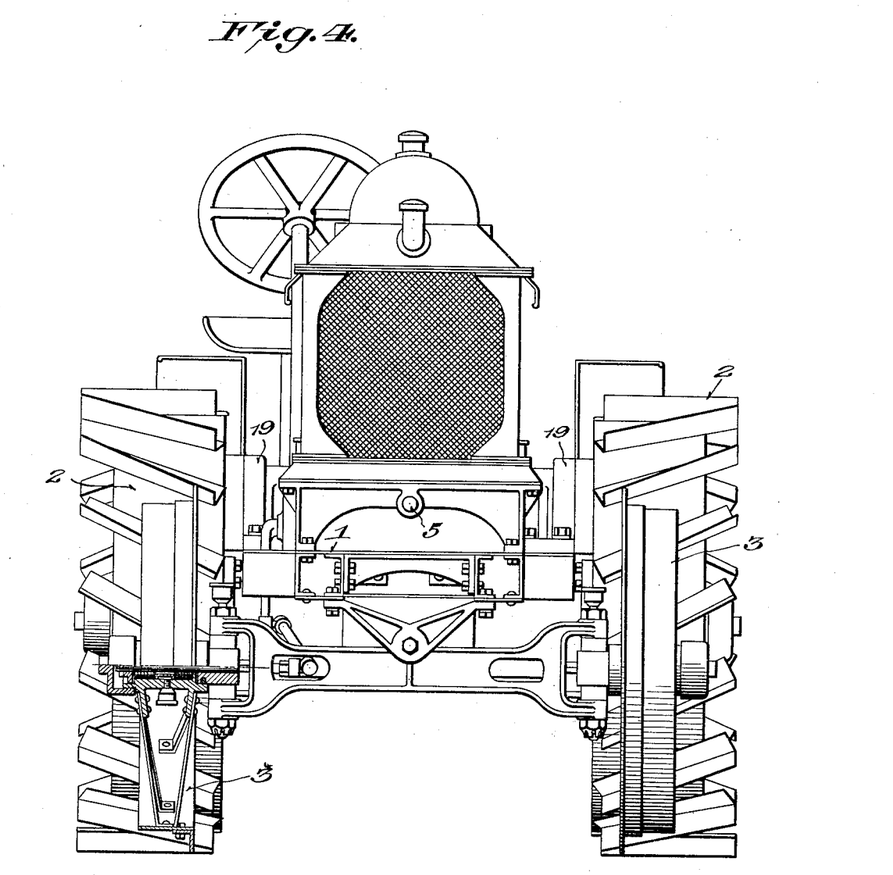
Fig. 4 is a front elevation, one of the front wheels being shown partly in section.
Figure 5:
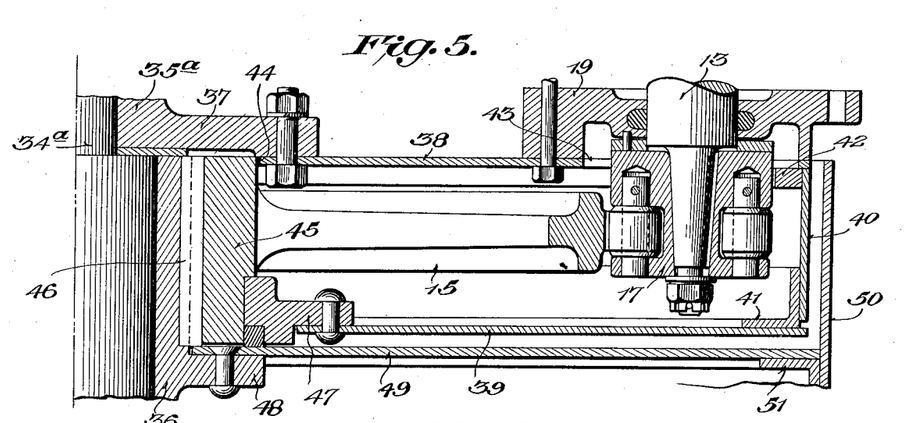
Figs. 5 and 6 are detail sectional views of the gear reductions which form the direct connections between the jack shafts and the traction wheels.
Figure 6:
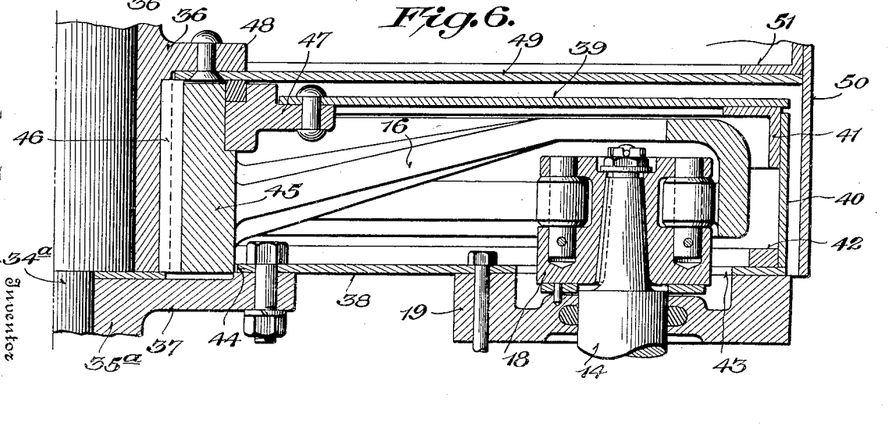
Figure 7:
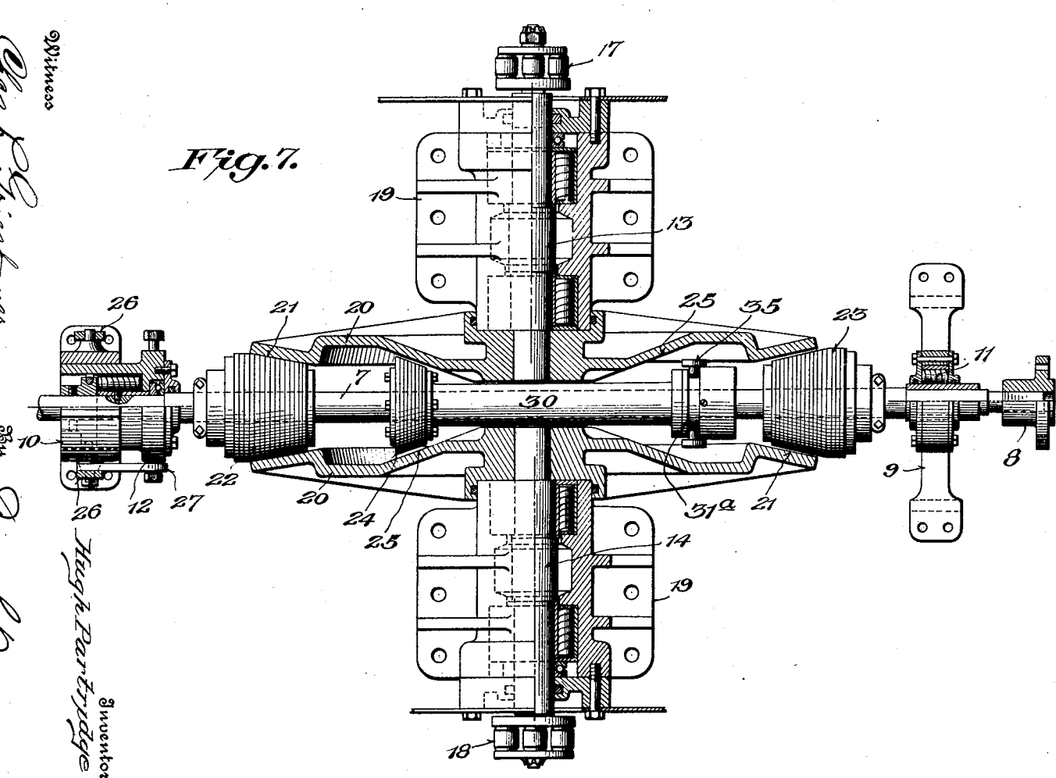
Fig. 7 is a detail horizontal sectional view of the friction gearing.
Figure 8:
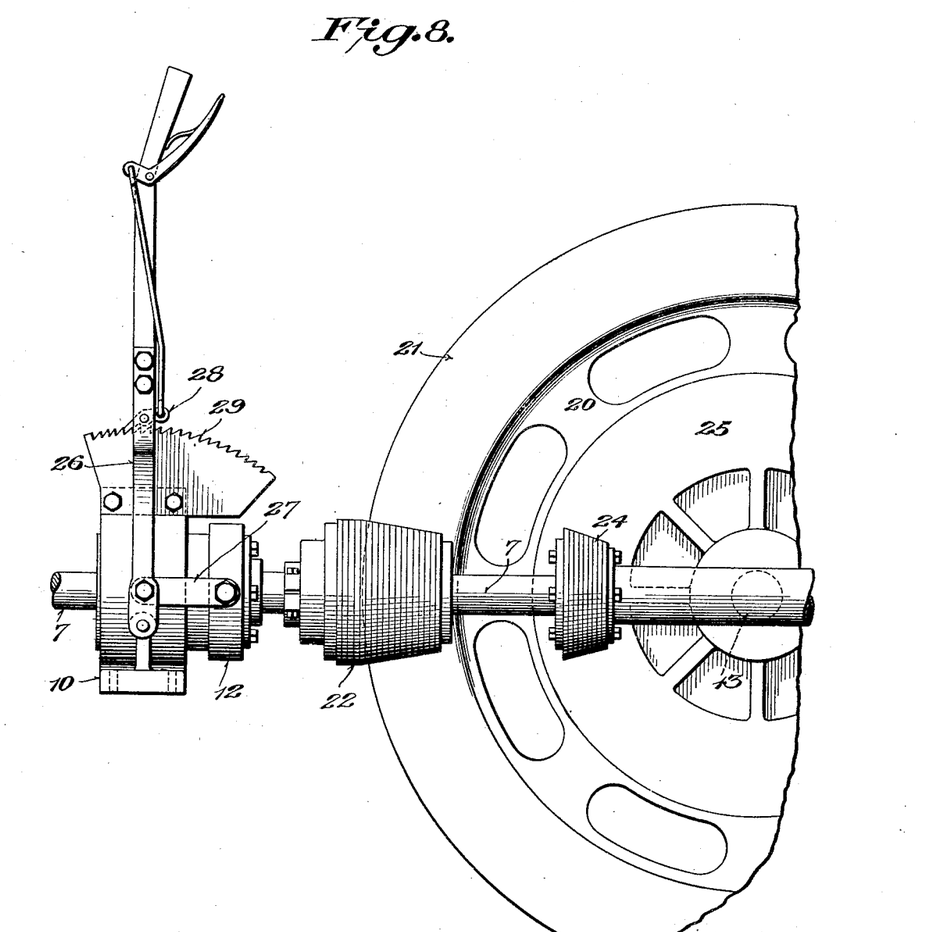
Fig. 8 is a detail view showing the arrangement of the lever for shifting the gears in connection with the forward or reverse drive.
Figures 9, 10:
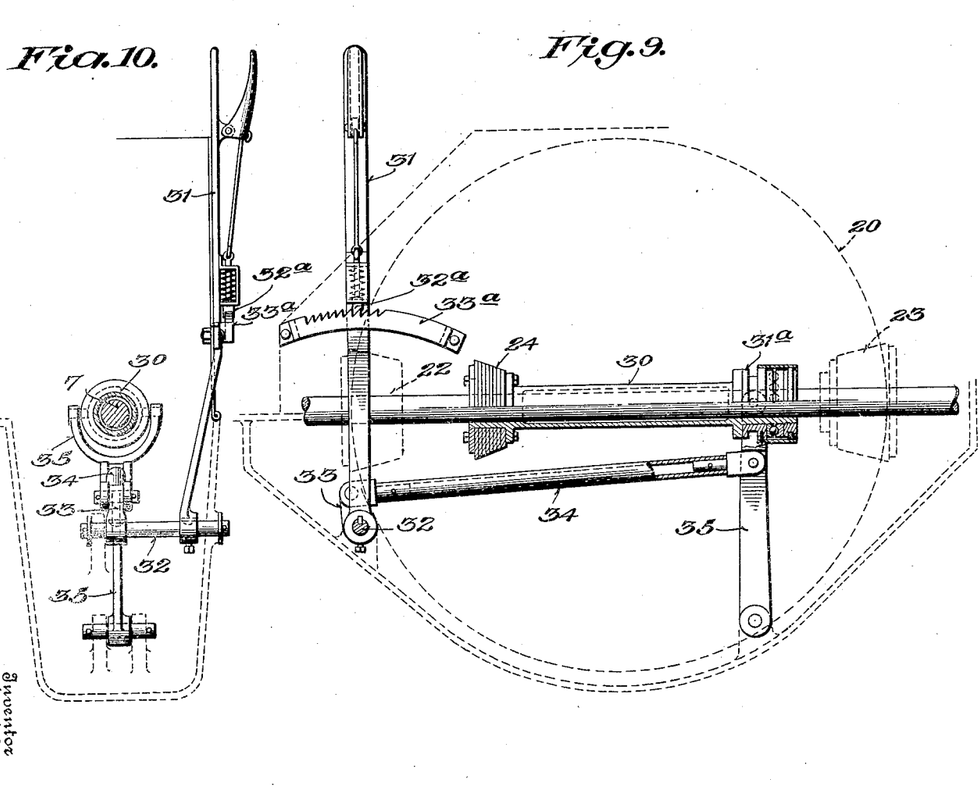
Fig. 9 is a detail view showing the arrangement of the lever for shifting one of the gear elements in changing the forward speeds.
Fig. 10 is an end elevation of the mechanism shown in Fig. 9, as viewed from the left.

Fig. 5 and 6 illustrate details of the wheels 2 which per se form the subject of my copending application Serial No. 304,865, and, therefore, need be only briefly referred to in passing. By reference to these figures, it will be observed that the gear elements which connect the jack shafts and the wheels are completely inclosed, several advantages being thereby secured, first, that said gear elements may run in oil, second, that they may be completely protected against dust, dirt and moisture, and third, that the wheels may be externally weighted as by loading them with cement. The axles or spindles 34ª (Fig. 3) upon which the wheels operate are fitted in brackets 35ª suitably secured to the frame 1, and project through the hub 36 of each wheel, suitable anti-friction elements being interposed between each spindle and its companion hub. The brackets 35 are provided adjacent the traction wheels with flanges 37 which serve for the attachment of a housing which incloses the gear elements and functions as a guard. Said housing comprises an inner plate 38, an outer plate 39 and a peripheral ring 40 which extends between and connects the plates 38 and 39. The ring 40 and plate 39 are riveted to a ring 41 of angle iron cross-section by which they are braced and connected and they may also be connected by welding. Adjacent the plate 38 the ring 40 is welded to an attachment ring 42 which is secured by bolts or otherwise to the plate 38; the latter, in turn, is secured to the flange 37 and also to the adjacent jack-shaft bearing 19 (Fig. 7). The plate 38 is provided with a suitable opening 43 through which the pinion 17 or 18, as the case may be, projects and also with a central opening 44 to accommodate the hub 45 of the gear wheel 15 or 16, as the case may be. The hub 45 is keyed as at 46 to the hub 36 of the traction wheel. Suitable packing is interposed between the flange 37 and the hub 36 and other suitable packing is interposed between the bearing 19 and the plate 38. The plate 39 has a central opening to accommodate the hub 45 and the guard is completed by a ring 47 secured to said plate adjacent said opening, and serving to brace the central portion of the plate; suitable packing is, of course, interposed between the ring 47 and the hub 45. The hub 36 projects outward beyond the inclosing guard and is formed with a circumscribing flange 48 to which is secured a plate or disk 49 forming the body of the wheel. The felly 50 is attached to the disk 49 as by a ring 51 of angle iron cross-section and is suitably braced relatively to the hub 36 by spokes 52. The plate 49 is preferably imperforate and the spokes 52 recede from said plate as they approach the hub. Consequently, the wheel proper has a triangular cross-section with one side constituted by the plate 49 imperforate, thereby to provide a solid base, and the other side, constituted by the spokes 52, of skeleton construction. By virtue of such structural characteristics, a body of cement may be incorporated with the wheel by casting the same upon the base 49 and utilizing the spokes 52 as braces and retainers. In this way, the wheel may be made of any increased weight desirable or necessary in consideration of the particular environments of use.

Having fully described my invention, I claim:—

1. In a tractor, in combination, a pair of substantially oppositely located traction wheels, a longitudinal main shaft, a pair of transverse alining jack shafts rotating at the same rate of speed and geared in the same ratio to the respective traction wheel to drive the latter at reduced speed, the gearing comprising an externally toothed gear wheel on one traction wheel, an internally toothed gear wheel on the other traction wheel and pinions on the respective jack shafts in mesh with the corresponding toothed wheel, the distances between the gear centers being different, and friction gearing for driving the jack shafts comprising confronting gear wheels on said jack shafts and a gear on the main shaft located between and for frictional engagement with said confronting gear wheels, the centers of said traction wheels being located at the same side of the jack shafts and offset in a common horizontal plane in accordance with the difference in the distances between the centers of the respective coöperating toothed wheels and pinions.

2. In a tractor, in combination, a pair of substantially oppositely-located traction wheels, a longitudinal main shaft, a pair of transverse alining jack shafts geared to the respective traction wheels to drive the latter at reduced speed, the gearing comprising an externally toothed gear wheel on one traction wheel, an internally toothed gear wheel on the other traction wheel, and pinions on the respective jack shafts in mesh with the corresponding toothed wheel, the axes of the traction wheels being offset in a common horizontal plane, and gearing for driving the jack shafts comprising confronting coaxial driving wheels on the respective jack shafts, and propelling means located between said driving wheels and coöperative therewith to drive them in reverse directions.

3. In a tractor, in combination, a pair of substantially oppositely-located traction wheels, a longitudinal main shaft, a pair of transverse alining jack shafts geared to the respective traction wheels to drive the latter at reduced speed, the gearing comprising an externally toothed gear wheel on one traction wheel, an internally toothed gear wheel on the other traction wheel, and pinions on the respective jack shafts in mesh with the corresponding toothed wheels, friction gears for driving the jack shafts comprising confronting gear wheels on said jack shafts, oppositely located gears mounted upon and fixed relatively to the main shaft and disposed between and for frictional engagement, one at a time, with said confronting gear wheels, means for shifting the main shaft in either direction of its axis thereby selectively to engage either of said main-shaft-gears with said confronting gear wheels, a motor-driven shaft, an operative connection between said motor-driven shaft and said main shaft which maintains the rotation but permits of the sliding movement of the latter, a gear slidably keyed on the main shaft and located between said oppositely-located main shaft gears for engagement with said confronting gear wheels to drive the jack shafts at increased speed, and means for moving said last-named gear slidably upon the main shaft.

In testimony whereof I have hereunto set my hand in presence of two subscribing witnesses.

HUGH PARTRIDGE.

Witnesses:
CHAS. F. BURROWS,
PAULINE J. CAUTHEN.